HIGH SPEED HOLOGRAPHIC OPTICAL PRINTING SYSTEM

This is a continuation of application Ser. No. 810,245, filed June 27, 1977, now abandoned.

BACKGROUND OF THE INVENTION

1. Field of the Invention

This invention relates to optical printing systems and more particularly to a high speed optical printing system employing a two dimensional holographic array, a hologram element of which is accessed by a spatially unmodulated substantially collimated light beam and in response thereto emits a spatially modulated beam which forms an image on a photoconductive drum.

2. Description of the Prior Art

Standard impact printer systems employ a rotating or translating member that contains one or more sets of the character vocabulary. To access the proper character an instant of time is selected, from the total available cycle time, at which the impact of a hammer transfers the desired character from the rotating of translating member to the printout paper. This approach has been employed to produce an optical printer wherein a light beam is directed, at the proper time, to a mask containing transparencies or templates of the character vocabulary to illuminate the desired character contained therein. The spatially modulated beam resulting therefrom is focussed upon a photoconductive drum member of an electrophotographic copier system wherein the character is rendered visible and transferred to a hard copy paper image. This time domain accessing of characters requires the light beam, which illuminates the rotating character mask, to be pulsed not only at the proper time to select the desired character but in such a fashion as to hold character blurring within acceptable tolerances. Consequently, the average light pulse duty cycle must include a pulse that is sufficiently brief to provide an instantaneous snapshot of the selected character at an average interpulse period that is equivalent to one cycle of the entire vocabulary of characters. To prevent blurring, the character motion must be less than five percent of the character dimension. Thus, if the printable vocabulary contains 100 symbols, an average light pulse duty cycle of $5 \times 10^{-4}$ is required. This duty cycle dictates a peak power level for the pulse system's light source that is 2,000 times greater than that of a light source in an illumination system which could function with a 100 percent duty cycle.

Time domain accessing for optical printing systems as described above exhibit printing speed limitations. A system employing a character reel that rotates at 3600 rpm and carries two vocabulary sets on its circumference has a printing rate of 120 characters per second or approximately 60 lines of printing per minute. To surmount this printing speed limitation a multiplicity of light sources has been employed and printing speeds of several thousand lines per minute have been achieved by employing one light source for each printing line on a page. This is a brute force approach that is expensive and which results in a short mean time between failures (MTBF). It will readily be appreciated that printing speeds of optical printing systems may be increased, without character blurring, by replacing the time dimension accessing procedure with a system that randomly positions a beam to access a stationary array of character generating masks.

SUMMARY OF THE INVENTION

The subject invention is a high speed printing system which includes a laser light source for illuminating a two dimensional light beam deflection system wherefrom the light beam from the laser source is deflected to access a desired hologram positioned in a two dimensional array of holograms. A spatially modulated light beam is directed from the illuminated hologram to form an image at a desired line position on a photoconductive drum. All columns of the two dimensional array of holograms are identical, each containing an ordered linear array of hologram elements each of which generates one character of the printed vocabulary. Each character position on a line of print is sequentially accessed by horizontally deflecting the light beam through one column position while simultaneously accessing the desired character by vertically deflecting the beam to the proper row, thus internally generated timing pulses readily control the printing rate and no internal buffer storage of character is required. Additionally, non-stepping motion of the electrophotographic drum may be achieved by having the hologram elements in succeeding columns provide images on a line that is slightly slanted to compensate for the continuous motion of the photoconductive drum.

DESCRIPTION OF THE PREFERRED EMBODIMENT

Figure 1:
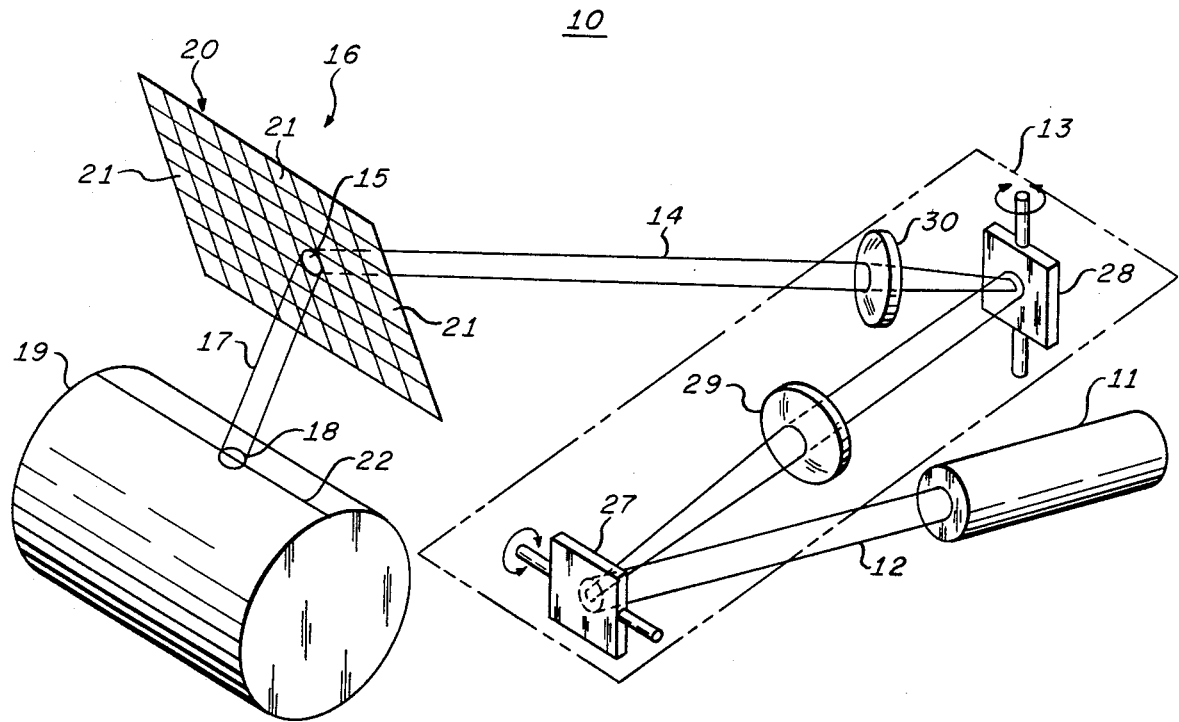
FIG. 1 is an optical schematic diagram of an embodiment of the invention.

Referring to FIG. 1, a high speed holographic optical printer 10 includes a laser source 11, such as a 441 nm He-Cd or a 488 nm argon, that emits a substantially collimated spatially unmodulated, light beam 12 which enters a two dimensional deflection system 13, wherefrom a light beam 14 is emitted to illuminate a selected hologram 15 positioned in a two dimensional array of holograms 16. A spatially modulated light beam 17 is emitted from the illuminated hologram 15 to form an image 18 at a preselected position on a photoconductive drum 19 which may be of the selenium type. The optical system shown in FIG. 1 provides for maximum printing speed by minimizing the optical information that is processed by the two dimensional deflection system 13. The spatially unmodulated light beam 12 emitted from the laser source 11 is deflected by the deflection system 13 to access the hologram 15, whereat the spatial modulation is imparted to the light beam which provides the character information to form an image on the continuously rotating photoconductive drum 19. The deflector system 13, thus provides as many beam positions as required to address all the holograms in the holographic array 16 while processing only one resolvable beam position at a time, thereby providing the highest possible access speed.

The holographic array 16 comprises a two dimensional array of individual holograms, each of which converts a substantially collimated, spatially unmodulated, light input signal into a spatially modulated light beam from which an image of an alpha-numeric character is formed at a given position on the photoconductor drum 19. The columns 20 of the array 16 are identical, each containing an ordered linear array of hologram elements 21 each of which generates one character of the printed vocabulary. Hologram elements 21, in each column 20 of the holograms, are recorded in such a fashion that the focussed image of the character generated by a hologram element 21 will be produced at a position, corresponding to the column 20, along a common line 22 on the photoconductive drum 19 regardless of the location of the hologram element 21 in the column 20. Stepping the horizontal position of the deflected light beam 14 to the adjacent column 20 accesses the adjacent position on the common line 22 and changing the vertical position of the deflected light beam 14 provides for accessing the hologram element 21 corresponding to the subsequent character to be printed.

Each elemental hologram 21 taken from a single column 20 includes both a predetermined interference fringe spacing which diffracts the input light beam into the correct direction toward the common line 22 position as well as a coded spatial message which generates a remotely focussed printed character onto the surface of a photoconductive drum. The holographic array 16, while acting as a cylindrical lens in one dimension to focus distinct characters onto the common line 22 contains no such focussing action in the orthogonal direction inasmuch as each column 20 of hologram elements 21 must provide access to separate print positions on the photoconductive drum 19.

Figure 2:
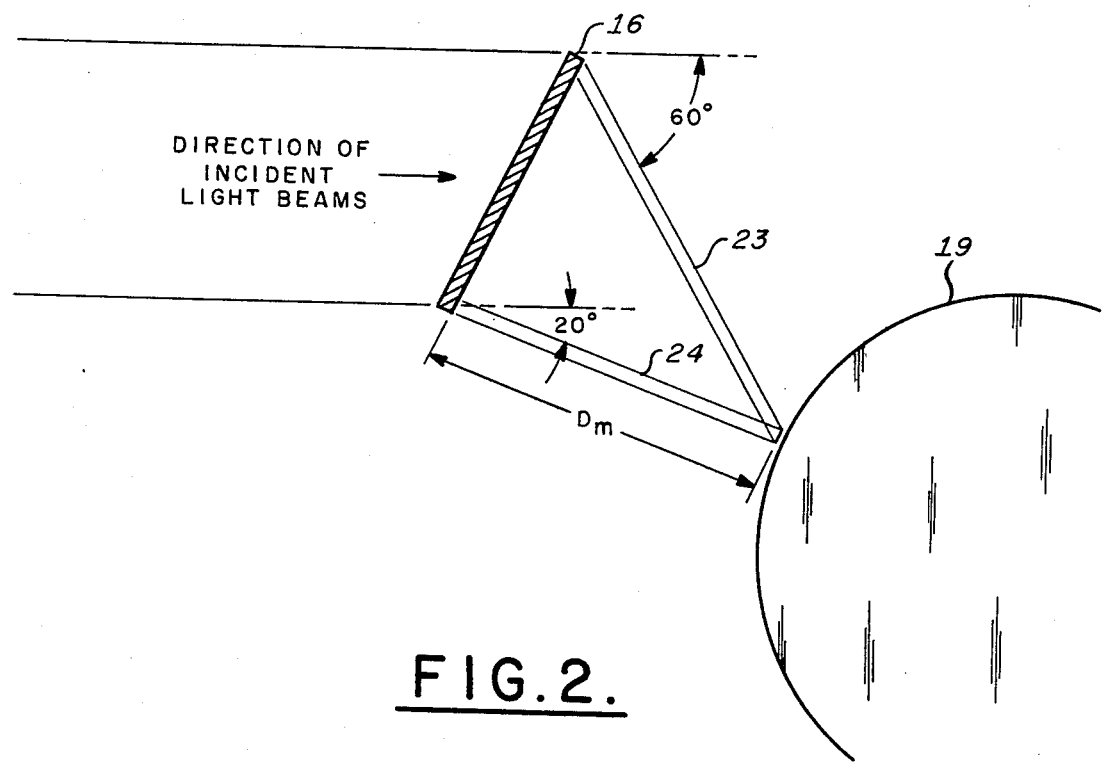
FIG. 2 is a cross-sectional view of the holographic array diffraction geometry.

Maximum sharpness and quality of the characters produced by each hologram element 21 of the holographic array 16 are limited by light diffraction effects. Consequently, a hologram element with an edge dimension A that is illuminated by a substantially collimated light beam having a wavelength $\lambda$, and positioned a distance D from the photoconductive drum 19 will provide a linear resolution on the photoconductive drum 19 of $\Delta S = D\lambda/A$. A minimum distance between any hologram element in the holographic array 16 and the photoconductive drum 19 is determined by a fall off in hologram diffraction efficiency at large angles. Since the diffraction efficiency of standard photographic films is reasonably constant up to 60 degrees, a possible diffraction geometry may be that as shown in vertical cross-section in FIG. 2 wherein $D_m$ represents the minimum distance between a hologram element and the photoconductive drum 19. If all dimensions are in centimeters, the maximum image resolution on the photoconductive drum 19 is then given by $A/D_m\lambda$ lines/cm.

The holographic array 16 arrangement described above minimizes the positional deflection accuracy required from the two dimensional deflection system 13. Each position of the printed character is solely a function of the position and focussing of the hologram element 21, which, when substantially illuminated, causes a character to be produced on the common line 22 at the location associated therewith. Additionally, the holographic array 16 provides a higher light throughput efficiency than standard template mask imaging techniques. Theoretically, the light throughput efficiency of a hologram can be 100 percent. In practice, holograms have been fabricated which diffract in excess of 25 percent of the incident light beam into a remotely focussed high quality image of the recorded character. Conversely, template masks typically transmit only a few percent of the incident light. Consequently, the use of holographic arrays either increases the speed capability of an optical printer system or lowers the laser power required for a comparable printing speed. Further, the hologram elements 21 in each column 20 of the holographic array 16 may be made to sequentially print characters along a slanted print line to compensate for the motion of the photoconductive drum. The time delay in printing one line can then be used in part to create the proper vertical spacing between adjacent lines. Continuous motion of the drum without complicated electronic pulsing to compensate for vertical character mispositioning as would occur in time domain character accessing offers a significant simplification in mechanical structure and results in a net cost savings.

Random positioning of the laser beam to access a hologram element 21 allows the laser source 11 write time to be greater than the light beam 12 positioning time. Consequently, as opposed to systems employing rotating members and time domain accessing, the effective laser duty cycle may approach unity which provides for a more efficient utilization of the laser source.

The two dimensional light beam deflection system 13 may comprise a vertical light beam deflector 27 and a horizontal light beam deflector 28. A substantially collimated light beam 12, incident to the vertical light beam deflector 27 is deflected therefrom at the proper vertical position to access a selected hologram element 21. This deflected light beam is then incident to the horizontal light beam deflector 28 whereat, it is deflected at the proper horizontal position to illuminate the selected hologram element 21 in the column 20 corresponding to the position on the line 22 at which the character is to be printed. Deflectors 27 and 28 must be capable of rapid random access positioning. Mechanical galvanometer deflectors such as the Honeywell M25K are available which can randomly access any of 220 Raleigh resolved beam positions in 50 microseconds and acousto-optic deflectors, are available, such as those manufactured by Isomet and Soro (French), which can access any of 400 to 1,000 resolvable positions in 5 microseconds. These random access speeds provide a maximum limiting printer speed that is approximately 10,000 lines per minute (LPM) for galvanometer deflectors and 100,000 LPM for acousto-optic deflectors. Since the holographic array 16 is comprised of m rows and n columns, m×n hologram elements 21 must be accessed. For the light beam deflector system 13 to separately access each hologram element 21, it must be capable of deflecting the substantially collimated light beam 12 to approximately twice the number of resolvable beam positions in each dimension. Consequently, the vertical light beam deflector 27 must be capable of providing 2m resolvable beam positions and the horizontal light beam deflector 28 must be capable of providing 2n resolvable beam positions. The two dimensional light beam deflector 13 may also include a focussing lens 29 placed between the vertical deflector 27 and the horizontal deflector 28 to refocus light deflected from deflector 27 onto deflector 28 and a lens 30 which functions to ensure the collimation of the light beam 14 that is emitted from the horizontal deflector 28 to provide a maximum number of resolvable beam positions at the holographic array 16.

The utilization of a single light source requires each character position on a line to be accessed by horizontally deflecting the light beam sequentially from one column position to another and for each column position the correct character is accessed by deflecting the beam through an arbitrary number of vertical positions. This electrical addressing may be simplified by having the input signal code only control the vertical positioning of the light beam deflector 27 and having internally generated timing pulses, which determine the printing and line rates, control the horizontal position of the horizontal light beam deflector 28. The internally generated timing pulses would advance the printer character position automatically one increment after each control signal input. In FIG. 1, an initial vertical light beam deflection and a subsequent horizontal light beam deflection is indicated. It will be apparent to those skilled in the art that these may be reversed without adversely affecting the over-all operation of the system.

While the invention has been described in its preferred embodiment, it is to be understood that the words which have been used are words of description rather than limitation and that changes may be made within the purview of the appended claims without departing from the true scope and spirit of the invention in its broader aspects.

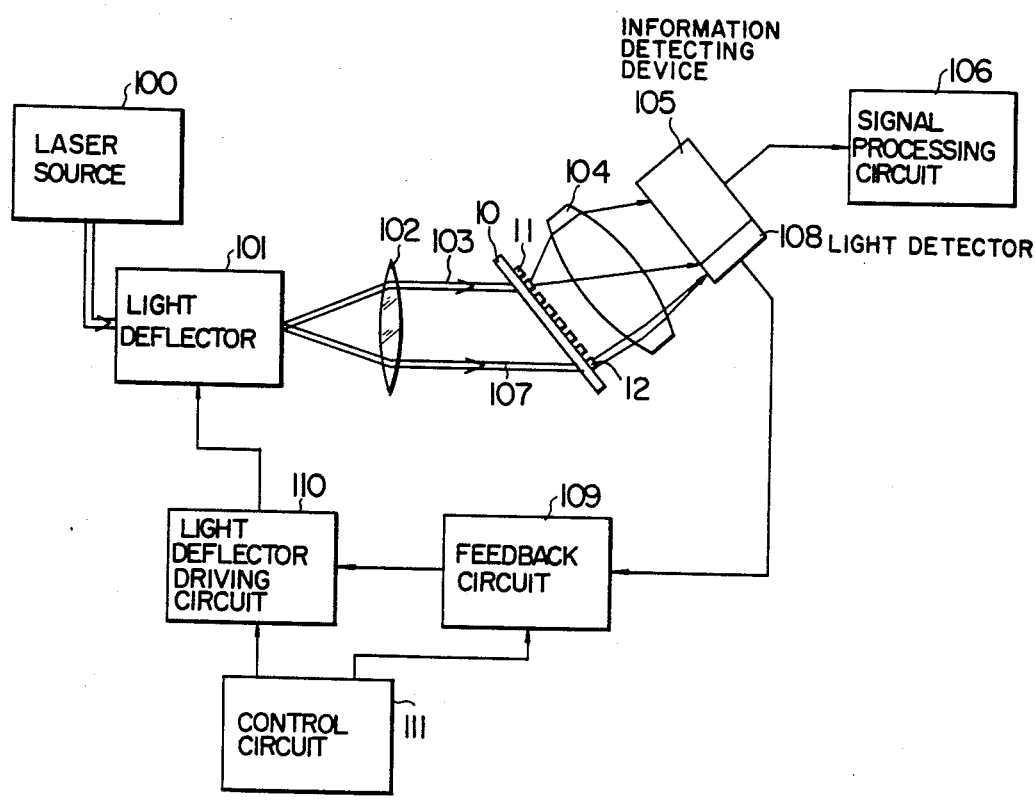

I claim:

1. An apparatus for projecting characters along recording lines of a continuously rotating photoconductive drum comprising:
   an array of character generating elements wherein each column of elements corresponds to a preassigned position on said recording lines whereat a character is formed when an element in said column is illuminated by a substantially collimated light beam, said array constructed and arranged such that said character generating elements in each column are positioned to provide characters along a slanted print line to provide compensation for said continuous rotation of said photoconductive drum thereby establishing non-slanted recording lines;
   means for directing a light beam to be incident to a selected element in a selected column; and
   means positioned between said directing means and said array of image generating elements for substantially collimating said incident light beam.

2. An apparatus in accordance with claim 1 wherein said directing means includes:
   first means for deflecting a light beam incident thereto in a predetermined plane; and
   second means for deflecting a light beam incident thereto from said first deflector means in a plane perpendicular to said predetermined plane, said light beam deflected from said second deflecting means being directed along a path to illuminate a preselected element in said array of character generating elements.

3. An apparatus in accordance with claim 2 wherein said first and second deflecting means are constructed and arranged such that said columns are sequentially accessed at a predetermined rate and a selected one of said character generating elements in an accessed column is selected in a random fashion to provide a selected character at said corresponding position on said recording line.

4. An apparatus in accordance with claim 2 further including:
   means positioned between said first and second deflecting means for focussing light beams deflected from said first deflecting means onto said second deflecting means; and
   means positioned between said second deflecting means and said array of character generating elements for emitting a substantially collimated light beam to illuminate said preselected character generating element.

5. An apparatus in accordance with claims 1, 2, 3 or 4 wherein said elements in each of said columns are located at at a preselected minimum distance from said rotating photoconductive drum and arranged to provide diffracted beams within an angular range between 20° and 60° from said incident light beam.

* * * * *

United States Patent [19]

Nakayama et al.

[11] 4,278,318
[45] Jul. 14, 1981

[54] HOLOGRAPHIC RECONSTRUCTING APPARATUS

[75] Inventors: Yoshikazu Nakayama; Fumikazu Tateishi, both of Hirakata; Katsuyuki Fujito, Higashiosaka, all of Japan

[73] Assignee: Matsushita Electric Industrial Co., Ltd., Osaka, Japan

[21] Appl. No.: 970,439

[22] Filed: Dec. 18, 1978

[30] Foreign Application Priority Data

Dec. 19, 1977 [JP] Japan .................. 52-153232
Sep. 14, 1978 [JP] Japan .................. 53-113166

[51] Int. Cl.³ .................................................. G03H 1/30
[52] U.S. Cl. .................................................. 350/3.78
[58] Field of Search .................. 356/399–401; 350/3.75, 3.78, 3.86

[56] References Cited

U.S. PATENT DOCUMENTS

| | | | |
|---|---|---|---|
| 3,560,072 | 2/1971 | Silverman et al. | 350/3.75 |
| 3,715,733 | 2/1973 | Feiner et al. | 350/3.78 |
| 3,911,410 | 10/1975 | Ohta et al. | 350/3.78 |

*Primary Examiner*—John K. Corbin
*Assistant Examiner*—Bruce Y. Arnold
*Attorney, Agent, or Firm*—Stevens, Davis, Miller & Mosher

[57] ABSTRACT

Holographic reconstructing apparatus capable of exchanging a hologram memory plate and having a large memory capacity, wherein the position of the memory plate relative to an irradiating laser beam can be accurately controlled. A beam irradiated from a laser source is deflected by a light deflector and is selectively directed to a selected hologram to be read or directed intermittently to a region for dividing the laser beam into a plurality of laser beams. The intensity of each divided laser beam is detected by a light detector, and the detection signal is fed back to control the working point of the light deflector such that the center of the laser beam irradiates the center of the luminous laser beam dividing region. The working point is held until the light deflector again directs the laser beam to the dividing region so that the laser beam radiates a selected hologram on the hologram plate accurately.

13 Claims, 15 Drawing Figures